US012339610B2

(12) United States Patent
Kogiso

(10) Patent No.: US 12,339,610 B2
(45) Date of Patent: Jun. 24, 2025

(54) IMAGE FORMING APPARATUS

(71) Applicant: Toshiba Tec Kabushiki Kaisha, Tokyo (JP)

(72) Inventor: Yoshiki Kogiso, Numazu Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 18/454,008

(22) Filed: Aug. 22, 2023

(65) Prior Publication Data

US 2024/0126200 A1 Apr. 18, 2024

(30) Foreign Application Priority Data

Oct. 13, 2022 (JP) ................................ 2022-164563

(51) Int. Cl.
*G03G 15/00* (2006.01)

(52) U.S. Cl.
CPC ................................ *G03G 15/5091* (2013.01)

(58) Field of Classification Search
CPC ........... G03G 15/5091; H04N 1/00342; H04N 1/00572; H04N 1/32138; G06K 17/0025
See application file for complete search history.

(56) References Cited

U.S. PATENT DOCUMENTS

2009/0009790 A1 1/2009 Hosokawa
2020/0293244 A1 9/2020 Takada
2021/0306512 A1* 9/2021 Sato .................. H04N 1/32138

FOREIGN PATENT DOCUMENTS

JP 2005-062858 A 3/2005

* cited by examiner

*Primary Examiner* — Hoang X Ngo
(74) *Attorney, Agent, or Firm* — Kim & Stewart LLP

(57) ABSTRACT

An image forming apparatus includes a communication device configured to communicate with a wireless tag of a sheet, an image forming mechanism configured to form an image and transfer the image to the sheet according to a control value, and a controller configured to: receive a job for printing an image on a sheet and performing tag processing on the tag, control the communication device to perform the tag processing on the tag, determine whether the processing has completed properly, upon determining that the processing has completed properly, control the image forming mechanism to form the image and transfer the image to the sheet according to a first control value, and upon determining that the processing has not completed properly, control the image forming mechanism to form the image and transfer the image to the sheet according to a second control value.

16 Claims, 5 Drawing Sheets

IMAGE FORMING APPARATUS

CROSS-REFERENCE TO RELATED APPLICATION(S)

This application is based upon and claims the benefit of priority from Japanese Patent Application No. 2022-164563, filed Oct. 13, 2022, the entire contents of which are incorporated herein by reference.

FIELD

Embodiments described herein relate generally to an image forming apparatus, a method carried out by an image forming apparatus, and an image forming system.

BACKGROUND

There are image forming apparatuses that have a wireless tag communication device for communicating with a radio frequency identification (RFID) tag, which is attached to or included in a sheet on which an image is printed. Such image forming apparatuses having a wireless tag communication device can perform tag processing such as data writing or data reading on or from the RFID tag of a sheet. It is desirable that the image forming apparatus be able to distinguish a sheet on which the tag processing has failed from another sheet.

For example, there is a conventional image forming apparatus that discharges a sheet on which the tag processing has failed, to a discharge destination different from a sheet on which the tag processing has succeeded. However, the sheet including the RFID tag in which the tag processing has failed cannot be distinguished from the sheet in which the tag processing has succeeded by its appearance even though the discharge destination of the sheet is different.

SUMMARY OF THE INVENTION

Embodiments of the present invention provide an image forming apparatus that forms an image on a print medium including a wireless tag that could not be processed normally, in a manner that enables an operator to easily determine visually that the wireless tag could not be processed normally.

According to an embodiment, an image forming apparatus comprises a wireless tag communication device configured to communicate with a wireless tag embedded in or attached to a sheet, an image forming mechanism configured to form an image on a medium and transfer the image from the medium to the sheet according to a control value, and a controller. The controller is configured to receive a print job for printing an image on a sheet and performing tag processing on a wireless tag of the sheet, control the wireless tag communication device to perform the tag processing on the wireless tag, determine whether the tag processing has completed properly, upon determining that the tag processing has completed properly, control the image forming mechanism to form the image on the medium and transfer the image from the medium to the sheet according to a first control value, and upon determining that the tag processing has not completed properly, control the image forming mechanism to form the image on the medium and transfer the image from the medium to the sheet according to at least one second control value different from the first control value.

DETAILED DESCRIPTION

Hereinafter, embodiments will be described in detail with reference to the drawings. The present invention is not limited to the embodiments described below.

First, a configuration of the image forming apparatus 1 according to an embodiment will be described.

Figure 1:
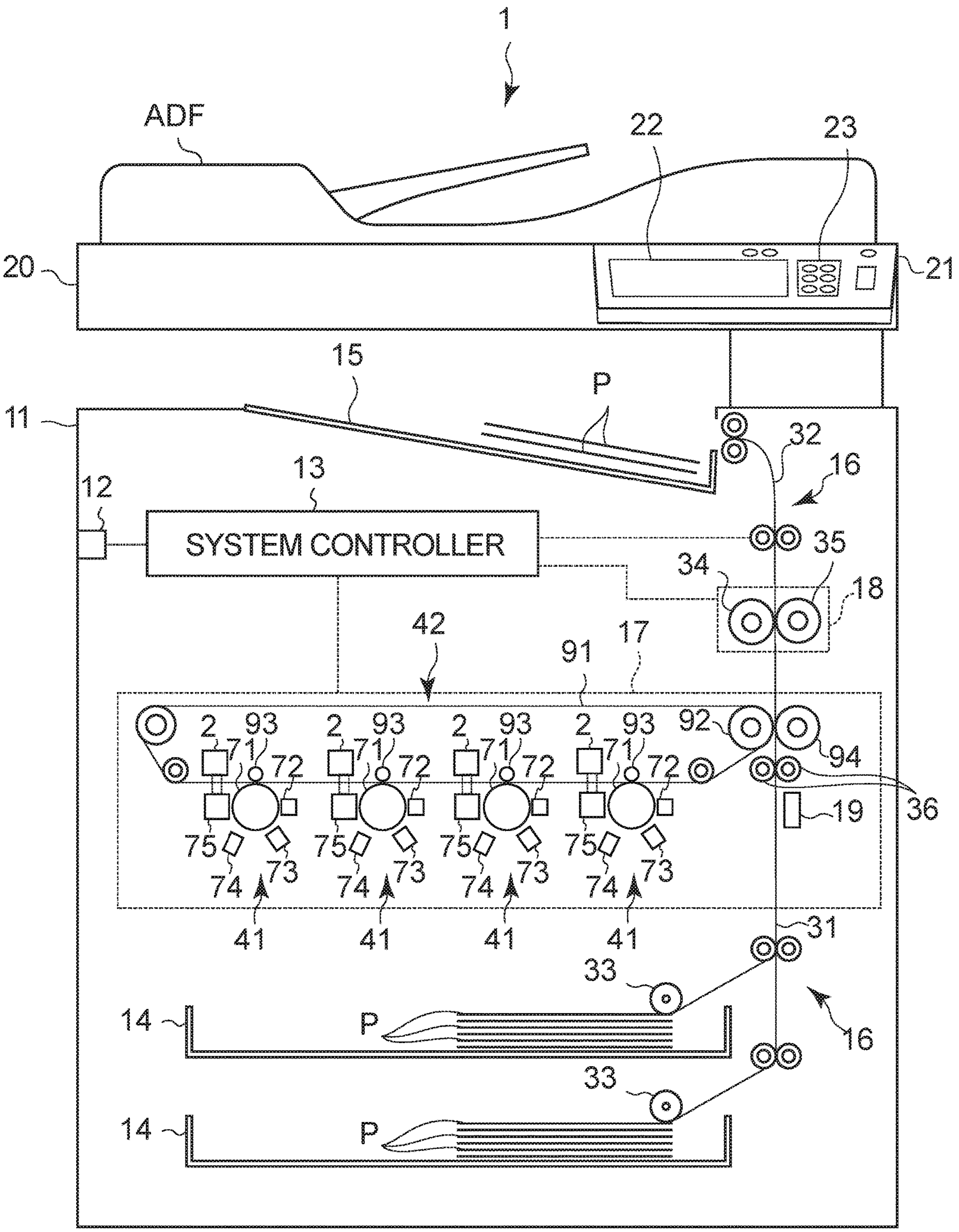
FIG. 1 is a configuration diagram of an image forming apparatus according to an embodiment.

FIG. 1 is a diagram illustrating an example of a configuration of a digital multifunction peripheral (MFP) including an electrophotographic printer, which is an example of an image forming apparatus 1 according to an embodiment.

The image forming apparatus 1 includes a printer that forms an image on a print medium P and a tag communication device 19 that communicates with an RFID tag, which is a wireless tag included in the print medium P. For example, the image forming apparatus 1 is placed in a workplace.

The wireless tag is a small wireless communication device that includes a processor, an internal memory, a wireless communication circuit, and an antenna. The wireless tag communicates with the tag communication device 19 of the image forming apparatus 1. The wireless tag executes processing in response to a command supplied from the tag communication device 19, and responds to the tag communication device 19 with a result of executing the processing. For example, when the wireless tag receives a read command, the wireless tag reads data stored in the internal memory and responds with the read data. When the wireless tag receives a write command, the wireless tag writes the data requested to be written into the internal memory, and outputs a response indicating the write result.

The printer of the image forming apparatus 1 prints an image on a print medium P including a wireless tag. The print medium P is, for example, a sheet. The sheet as the printing medium P may be a sheet in which a wireless tag is embedded or a sheet to which a wireless tag is attached. Hereinafter, it is assumed that the print medium P is a sheet including an RFID tag as an exemplary wireless tag.

In the configuration example illustrated in FIG. 1, the image forming apparatus 1 includes a printer that forms an image on a print medium P by an electrophotographic process. However, the image forming method of the image forming apparatus 1 is not limited to the electrophotographic method. The printer of the image forming apparatus 1 of the configuration example shown in FIG. 1 forms an image to be developed by toner (i.e., developer) on a print medium P. The toner may be a single-color toner or a plurality of color toners. The toner may be a toner that can be decolored. FIG. 1 is a diagram illustrating a configuration example of the image forming apparatus 1 that performs image forming processing using four color toners of yellow, magenta, cyan, and black.

In the configuration example illustrated in FIG. 1, the image forming apparatus 1 includes a housing 11, a communication interface 12, a system controller 13, a plurality of sheet trays 14, a sheet discharge tray 15, a conveyance mechanism 16, an image forming mechanism 17, a fixing unit 18, a scanner 20, and a control panel 21.

The housing 11 is the main body of the image forming apparatus 1. The housing 11 houses, for example, the communication interface 12, the controller 13, the plurality of sheet trays 14, the conveyance mechanism 16, the image forming mechanism 17, the fixing unit 18, and the like. The discharge tray 15 is disposed on the upper surface of the housing 11.

The communication interface 12 is a communication interface circuit for communicating with other external devices connected through a network. Such external devices include a user terminal that issues a print job and a server as a management device that manages information of RFID tags included in print media P. The communication interface 12 includes, for example, a local area network (LAN) connector. The communication interface 12 may wirelessly communicate with other devices according to a standard such as Bluetooth (registered trademark) or Wi-Fi (registered trademark).

The controller 13 controls each unit of the image forming apparatus 1, performs data processing, and the like. For example, the controller 13 includes a processor, a memory, and various interfaces. The controller 13 performs control and data processing of each unit by the processor executing a program stored in the memory. The controller 13 is connected to each part in the housing 11 by various internal interfaces. For example, the controller 13 is connected to the communication interface 12, the sheet discharge tray 15, the conveyance mechanism 16, the image forming mechanism 17, the fixing unit 18, the scanner 20, and the like.

The controller 13 acquires a print job including image data and the like received from an external device via the communication interface 12. The image data included in the print job is data indicating an image to be formed on the print medium P. The image data may be data for forming an image on one print medium P or data for forming an image on a plurality of print media P.

In addition, the print job may include information indicating the processing to be performed on the RFID tag included in the print medium P. The processing on the RFID tag may be instructions for writing data to the RFID tag or instructions for reading data from the RFID tag. In addition, the print job may include information indicating a discharge position at which the print medium P on which the image is formed is discharged (e.g., a discharge tray, a discharge direction, and the like). The print job may include information indicating a printing condition, such as information indicating color printing or monochrome printing.

The controller 13 includes an engine controller that controls operations of the conveyance mechanism 16, the image forming mechanism 17, and the fixing unit 18. For example, the controller 13 controls the conveyance of the print medium P by the conveyance mechanism 16. The controller 13 controls the formation of the developer image by the image forming mechanism 17 and the transfer of the developer image to the print medium P. The controller 13 controls the fixing of the developer image to the print medium P by the fixing unit 18. The controller 13 controls the operations of the conveyance mechanism 16, the image forming mechanism 17, and the fixing unit 18 to form an image of the image data included in the print job on the print medium P.

Note that the image forming apparatus 1 may be configured to include an engine controller separately from the controller 13. For example, the image forming apparatus 1 may be provided with an engine controller that controls at least one of the conveyance mechanism 16, the image forming mechanism 17, the fixing unit 18, and the like separately from the controller 13. The engine controller provided separately from the controller 13 may acquire information necessary for control from the controller 13.

The plurality of sheet trays 14 are cassettes each storing a print medium P. The sheet tray 14 is configured to be able to refill the print medium P with the RFID tag. For example, the sheet tray 14 is configured to be able to be pulled out from the housing 11. The sheet tray 14 is loaded into the housing 11 after the print medium P including the RFID tag is refilled in the pulled-out condition.

The conveyance mechanism 16 is a mechanism that conveys the print medium P in the image forming apparatus 1. As illustrated in FIG. 1, the conveyance mechanism 16 includes a plurality of conveyance paths. The conveyance mechanism 16 includes a sheet feeding conveyance path 31 and a sheet discharge conveyance path 32.

The sheet feeding conveyance path 31 and the sheet discharge conveyance path 32 are constituted by a plurality of rollers, a plurality of guides, and the like. The plurality of rollers are rotated by the power transmitted from the drive mechanism to convey the print medium P. The plurality of guides control the conveyance direction of the print medium P conveyed by the rollers.

The print medium P is taken from the sheet tray 14 and supplied to the image forming mechanism 17 along the sheet feeding conveyance path 31. Along the sheet feeding conveyance path 31, a plurality of pickup rollers 33 are arranged corresponding to the respective sheet trays 14. Each of the pickup rollers 33 feeds one print medium P to be taken out from the sheet tray 14 to the sheet feeding conveyance path 31.

Along the sheet feeding conveyance path 31, the print medium P is supplied to a transfer position of a toner image generated by the image forming mechanism 17 using toner (i.e., developer). The registration roller 36 is provided in front of the transfer position in the sheet feeding conveyance path 31. The registration roller 36 feeds the print medium P fed from the sheet tray 14 to the transfer position in accordance with the transfer timing of the image at the transfer position. For example, the registration roller 36 temporarily stops the print medium P fed from the sheet tray 14. The registration roller 36 sends the print medium P to the transfer position in response to an instruction from the system controller 13.

The print medium P on which an image is formed by the image forming mechanism 17 is conveyed along the sheet discharge conveyance path 32 and discharged to the sheet discharge tray 15. The sheet discharge tray 15 is a tray that receives the print medium P discharged from the image forming apparatus 1. When the image forming apparatus 1 includes a plurality of sheet discharge positions, the sheet discharge conveyance path 32 operates to discharge the print medium P to a sheet discharge position designated by the system controller 13.

The image forming mechanism 17 includes a configuration for forming an image on the print medium P. Details of the image forming mechanism 17 will be described later.

The fixing unit 18 includes a heat roller 34 and a pressure roller 35. The fixing unit 18 heats the print medium P conveyed through the sheet discharge conveyance path 32 by the heat roller 34 at a predetermined temperature. The fixing unit 18 further presses the printing medium P heated by the heat roller 34 by the pressure roller 35. The fixing unit 18 fixes an image on the print medium P (i.e., the developer image) to the print medium P by heating and pressurizing the print medium P.

The tag communication device 19 communicates with the RFID tag included in the print medium P. The tag communication device 19 is disposed inside the housing 11 so as to communicate with the RFID tag of the print medium Pin front of the registration roller 36. The tag communication device 19 provides commands to the RFID tag via wireless communication. The tag communication device 19 receives a reply from the RFID tag. The RFID tag executes a process in response to a command from the tag communication device 19, and transmits the result of executing the command to the tag communication device 19.

The tag communication device 19 reads data from the RFID tag and writes data to the RFID tag in response to an instruction from the system controller 13. When the system controller 13 instructs reading of data from the RFID tag, the tag communication device 19 executes a process of reading data from the RFID tag. When the system controller 13 instructs writing of data to the RFID tag, the tag communication device 19 executes a process of writing data to the RFID tag.

The scanner 20 is a device that reads a document and converts it into image data. The scanner 20 is installed on an upper portion of the housing 11. The scanner 20 reads an image of a document set on a document platen glass provided on an upper portion of the housing 11. In addition, the scanners 20 include an automated document feeder (ADF). The scanners 20 also have a function of reading images of documents conveyed by the ADF.

The control panel 21 includes a touch panel 22, a keyboard 23, and the like. The touch panel 22 includes a display such as a liquid crystal display or an organic EL display, and a touch sensor that detects a touch input. The display including the touch panel 22 is a display device of the image forming apparatus 1.

The keyboard 23 includes various keys for the user of the image forming apparatus 1 to operate. For example, the keyboard 23 includes a numeric keypad, a power key, a sheet feed key, function keys, and the like. Each key may be referred to as a button. The touch panel 22 and the keyboard 23 are input devices of the image forming apparatus 1.

Next, the image forming mechanism 17 will be described.

As illustrated in FIG. 1, the image forming mechanism 17 includes a plurality of image forming stations 41 and a transfer mechanism 42. Each image forming station 41 forms a toner image. Each image forming station 41 is provided for a corresponding type of toner. In the example illustrated in FIG. 1, each image forming station 41 corresponds to corresponding color toner such as yellow, magenta, cyan, or black from the left side. Each image forming station 41 comprises a toner cartridge 2 containing toner of the corresponding color. FIG. 1 illustrates the image forming apparatus 1 including four image forming stations 41 corresponding to four color toner of yellow, magenta, cyan, and black.

Next, each image forming station 41 will be described.

Each of the image forming stations 41 includes a photoconductor drum or photoconductor 71, a cleaner 72, a charger 73, an exposure unit 74, a developing unit 75, and a primary transfer roller (or a transfer unit).

The photosensitive drum 71 includes a cylindrical drum and a photosensitive layer formed on the outer peripheral surface of the drum. The photoconductor drum 71 is a photoconductor. The outer peripheral surface of the photoconductor drum 71 is an image bearing member. The photoconductor drum 71 rotates at a constant speed by the power transmitted from the drive mechanism. The cleaner 72 has a blade in contact with the surface of the photoconductor drum 71. The cleaner 72 uses a blade to remove toner remaining on the surface of the photoconductor drum 71.

The charger 73 uniformly charges the surface of the photosensitive drum 71. The charger 73 charges the photoconductor drum 71 to a uniform negative potential by applying a grid bias voltage output from the grid electrode to the photoconductor drum 71.

The exposure unit 74 includes a plurality of light-emitting elements. The light-emitting device is, for example, a laser diode (LD), a light-emitting diode (LED), or an organic EL (OLED). The plurality of light emitting elements are arranged in a main scanning direction that is a direction parallel to the rotation axis of the photoconductor drum 71. Each light-emitting element is configured to irradiate a corresponding region on the photoconductor drum 71 with light.

The exposure unit 74 irradiates the surface of the charged photoconductor drum 71 with light from a plurality of light emitting elements arranged in the main scanning direction, thereby forming an electrostatic latent image for one line on the photoconductor drum 71. Further, the exposure unit 74 continuously irradiates the rotating photoconductor drum 71 with light, thereby forming electrostatic latent images of a plurality of lines.

The developing unit 75 is a device for attaching toner to the photosensitive drum 71. The developing unit 75 contains a developer including toner and a carrier. The developing unit 75 stirs the toner supplied from the toner cartridge 2 and the carrier by a stirring mechanism. The developing unit 75 supplies toner to the photosensitive drum 71 from a developing roller to which the developer including toner and the carrier agitated by an agitating mechanism is adhered. The developing unit 75 develops the electrostatic latent image on the photoconductive drum 71 with toner by supplying the toner to the photoconductive drum 71. The photoconductor drum 71 holds a toner image (i.e., developer image) developed with toner by the developing unit 75. The photoconductor drum 71 rotates to send a toner image to a transfer position to a transfer belt 91.

The transfer mechanism 42 transfers the toner image formed on the surface of the photoconductor drum 71 to the print medium P. In the configuration example illustrated in FIG. 1, the transfer mechanism 42 includes a transfer belt 91, a drive roller 92, a plurality of primary transfer rollers 93, and a secondary transfer roller 94.

The transfer belt 91 is a medium to which a toner image formed on the surface of the photoconductor drum 71 of each image forming station 41 is transferred. The transfer belt 91 is an intermediate transfer member that holds an image to b e transferred to the print medium P. In the configuration example illustrated in FIG. 1, the transfer belt 91 is an endless belt wound around the drive roller 92 and a plurality of winding rollers. The rear surface of the transfer belt 91, which is the inner surface, is in contact with the drive roller 92 and the plurality of winding rollers. A surface of the transfer belt 91, which is an outer surface, faces the photoconductor drum 71 of each image forming station 41.

The drive roller 92 is rotated by power transmitted from the drive mechanism. The drive roller 92 rotates to convey the transfer belt 91. In the configuration example shown in FIG. 1, the drive roller 92 rotates counterclockwise. By the rotation of the drive roller 92, the transfer belt 91, which is an endless belt, is conveyed so as to rotate in a counter-clockwise direction. The plurality of winding rollers are freely rotatable. The plurality of winding rollers rotate in accordance with the movement of the transfer belt 91 by the drive roller 92.

A primary transfer roller 93 is provided for each image forming station 41. Each of the primary transfer rollers 93 is provided so as to face the photosensitive drum 71 of the corresponding image forming station 41. Each of the primary transfer rollers 93 is provided at a position opposed to the photosensitive drum 71 of the corresponding image forming station 41 with the transfer belt 91 interposed therebetween. A position where the primary transfer roller 93 faces the photosensitive drum 71 with the transfer belt 91 interposed therebetween is referred to as a primary transfer portion. The toner image formed on the photoconductor drum 71 is transferred to the transfer belt 91 by the primary transfer roller 93.

The primary transfer roller 93 is in contact with the inner peripheral surface side of the transfer belt 91. The primary transfer roller 93 presses the transfer belt 91 from the inner peripheral surface side toward the photosensitive drum 71. The outer peripheral surface of the transfer belt 91 pressed by the primary transfer roller 93 comes into contact with the photosensitive drum 71. When the toner image is transferred from the photoconductor drum 71, the primary transfer roller 93 applies a transfer bias to the photoconductor drum 71 via the transfer belt 91. The toner image is transferred from the photoconductor drum 71 to the transfer belt 91 by a transfer bias applied from the primary transfer roller 93.

The secondary transfer roller 94 is provided to face the drive roller 92. The secondary transfer roller 94 is in contact with the surface of the transfer belt 91 on which the inner peripheral surface is conveyed by the drive roller 92. The secondary transfer roller 94 presses the transfer belt 91 toward the drive roller 92. A surface of the transfer belt 91 sandwiched between the drive roller 92 and the secondary transfer roller 94 is in close contact with the secondary transfer roller 94. A transfer nip is formed at a portion where the surface of the transfer belt 91 and the secondary transfer roller 94 come into close contact with each other. The transfer nip functions as a transfer unit that transfers the toner image (i.e., the developer image) formed on the surface of the transfer belt 91 to the print medium P.

The secondary transfer roller 94 conveys the printing medium P supplied by the registration roller 36 in a state of being sandwiched between the printing medium P and the transfer belt 91. The print medium P passes through the transfer nip. The secondary transfer roller 94 presses the print medium P passing through the transfer nip against the surface of the transfer belt 91.

The secondary transfer roller 94 applies a bias voltage (hereinafter referred to as a secondary transfer bias or a transfer bias) to the transfer belt 91 via the print medium P at the transfer nip. The secondary transfer roller 94 applies the secondary transfer bias specified by the system controller 13. When the printing medium P passes through the transfer nip in a state where the secondary transfer roller 94 applies the transfer bias, the toner image on the transfer belt 91 is transferred to the printing medium P.

The density of the toner image transferred from the transfer belt 91 to the print medium P passing through the transfer nip is set by the value of the transfer bias applied by the secondary transfer roller 94. The system controller 13 controls the density of the toner image to be transferred to the print medium P by setting the transfer bias corresponding to the tag processing performed on the RFID tag of the print medium P.

When the tag processing is normally completed, the system controller 13 sets the secondary transfer bias to a setting value for normal printing. When the secondary transfer bias is set to the setting value for normal printing, the toner image on the transfer belt 91 is transferred to the printing medium P at a normal density. When the tag processing is not normally completed, the system controller 13 sets the secondary transfer bias to a setting value for abnormal processing. When the secondary transfer bias is set to the setting value for abnormal processing, the toner image on the transfer belt 91 is transferred to the printing medium P at an abnormal density different from the normal density.

The transfer mechanism 42 transfers (i.e., primary transfer) the toner image on the photoconductor drum 71 to the transfer belt 91 that comes into contact with the photoconductor drum 71 by the transfer bias applied from the primary transfer roller 93 in the primary transfer portion. When the plurality of image forming stations 41 are provided, the transfer mechanism 42 performs the primary transfer of the toner image from the photoconductor drum 71 of the plurality of image forming stations 41 to the transfer belt 91.

The transfer mechanism 42 sends the toner image, which is primarily transferred onto the surface of the transfer belt 91, to the transfer nip. The transfer mechanism 42 transfers the toner image transferred onto the surface of the transfer belt 91 to the print medium P that passes through the transfer nip where the secondary transfer roller 94 applies the transfer bias. The transfer belt 91 is an example of an image carrier that holds the toner image to be transferred to the print medium P.

Next, a configuration of a control system in the image forming apparatus 1 according to an embodiment will be described.

Figure 2:
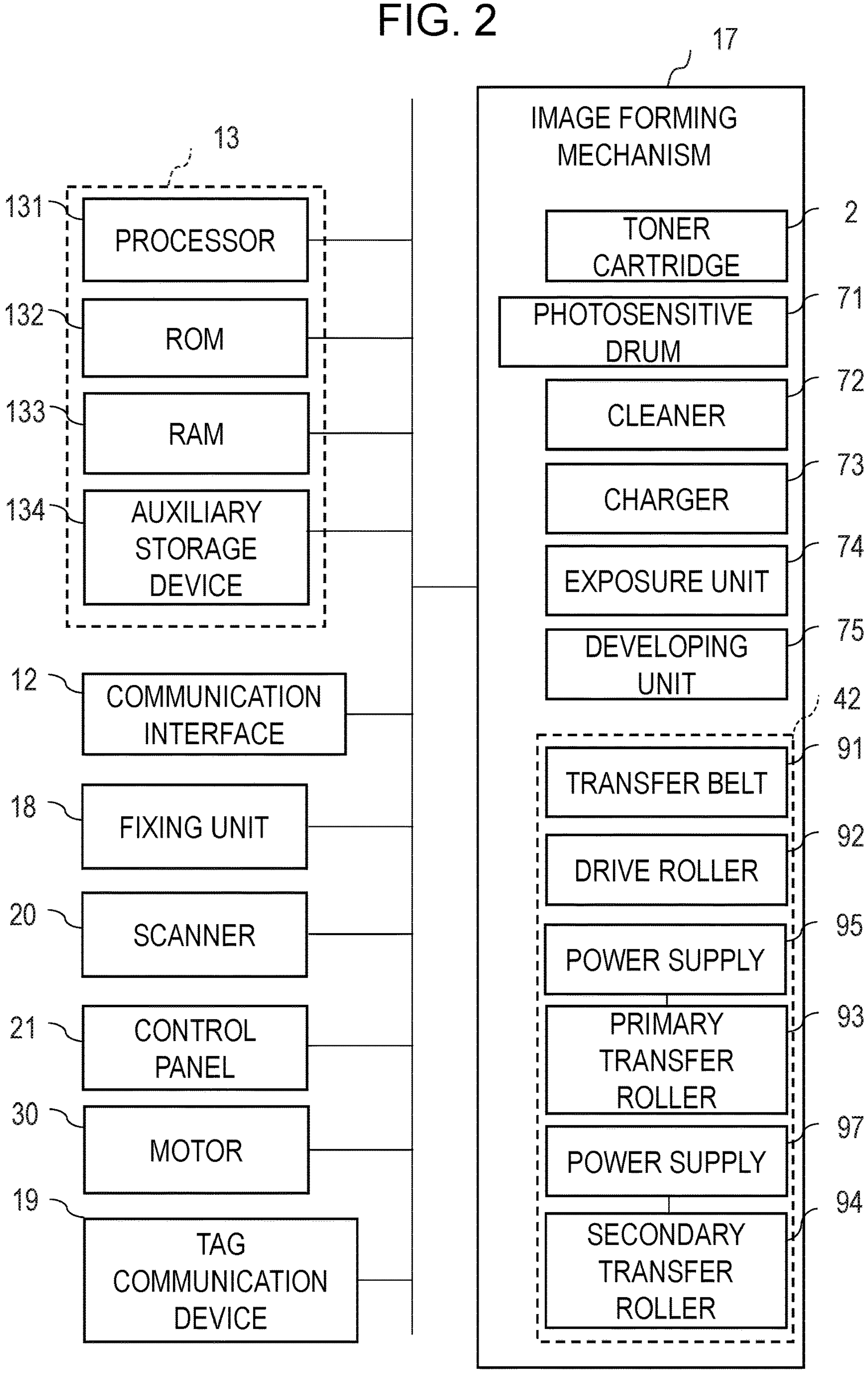
FIG. 2 is a hardware block diagram of the image forming apparatus.

FIG. 2 is a hardware block diagram of the control system in the image forming apparatus 1.

As illustrated in FIG. 2, the image forming apparatus 1 includes the communication interface 12, the image forming mechanism 17, the fixing unit 18, the tag communication device 19, the scanner 20, the control panel 21, a motor 30, and the like, which are connected to the system controller 13.

The controllers 13 include a processor 131, a Read Only Memory (ROM) 132, a Random Access Memory (RAM) 133, and an auxiliary storage device 134. In addition, the controllers 13 may include an application-specific integrated circuit (ASIC) or the like that performs image-processing.

The processor 131 controls each unit of the image forming apparatus 1 according to an operating system or an application program. The processor 131 is, for example, a Central Processing Unit (CPU).

The ROM 132 includes a non-volatile memory area, and the RAM 133 includes a volatile memory area. The ROM 132 stores the operating system or application program. The ROM 132 stores control data required for the processor 131 to execute a process for controlling each unit. The RAM 133 is used as a work area in which the processor 131 appropriately rewrites data. The RAM 133 has, for example, a work area for storing image data.

The auxiliary storage device 134 is a storage device such as an Electric Erasable Programmable Read-Only Memory (EEPROM), a Hard Disc Drive (HDD), or a Solid State Drive (SSD), for example. The auxiliary storage device 134 stores data such as setting data used by the processor 131 to perform various processes. The auxiliary storage device 134 stores data generated by the processing executed by the processor 131. The auxiliary storage device 134 may store an application program.

For example, the auxiliary storage device 134 stores transfer setting information for transferring the developer image on the transfer belt 91 to the print medium P as setting data. The transfer setting information includes a setting value that differs between a case where tag processing for the RFID tag of the print medium P is normally completed and a case where the tag processing is not normally completed. The auxiliary storage device 134 stores a plurality of pieces of transfer setting information corresponding to various transfer settings. The transfer setting information includes a setting value of the secondary transfer bias applied by the secondary transfer roller 94 at the transfer nip.

For example, the auxiliary storage device 134 stores transfer setting information to be used when the tag processing is normally completed and transfer setting information to be used when the tag processing is not normally completed. The transfer setting information when the tag processing is normally completed includes a setting value of a transfer bias for transferring a developer image to a print medium P at a predetermined, normal density. Further, the transfer setting information in a case where the tag processing is not completed normally includes a setting value of a transfer bias for transferring a developer image to a print medium P at an abnormal density different from the predetermined density.

The controller 13 is connected to the toner cartridge 2, the photoconductor drum 71, the cleaner 72, the charger 73, the exposure unit 74, and the developing unit 75 in each of the image forming stations 41. The controller 13 controls the toner cartridge 2, the photosensitive drum 71, the cleaner 72, the charger 73, the exposure unit 74, and the developing unit 75. For example, the controller 13 controls on/off of charging the charger 73 of each image forming station 41. The controller 13 controls on/off of the laser beam to be applied to the photosensitive drum with respect to the exposure unit 74 of each image forming station 41. In addition, the controller 13 controls on/off of the developing bias with respect to the developing unit 75 of each image forming station 41.

The controller 13 is connected to the transfer mechanism 42. The transfer mechanism 42 includes the transfer belt 91, the drive roller 92, the plurality of primary transfer rollers 93, the secondary transfer roller 94, and power supplies 95 and 97. The plurality of primary transfer rollers 93 are primary transfer rollers provided in the respective image forming stations 41.

The power supply 95 supplies a primary transfer bias applied by the primary transfer roller 93 to the photoconductor drum 71 facing the transfer belt 91. The power supply 95 may be a current source or a voltage source.

The power supply 95 is connected to the controller 13. The controller 13 controls on/off of the primary transfer bias applied to the photoconductor drum 71 to which the primary transfer roller 93 faces by the power supply 95. The controller 13 controls the value of the primary transfer bias applied by the primary transfer roller 93 by the power supply 95.

The power supply 97 supplies a secondary transfer bias applied to the drive roller 92 that is opposed to the secondary transfer roller 94 across the transfer belt 91. The power supply 97 is connected to the controller 13. The controller 13 controls on/off of the transfer bias applied by the secondary transfer roller 94 by the power supply 97. The controller 13 controls the value of the transfer bias applied by the secondary transfer roller 94 by the power supply 97. For example, the controller 13 determines the transfer bias based on the transfer setting corresponding to the process performed on the RFID tag of the print medium P. Further, the controller 13 may adjust the value of the transfer bias in accordance with the basis weight, the thickness, the type, and the like of the print medium P.

The motor 30 is a motor that operates each unit. The motor 30 is connected to the controller 13. The motor 30 is driven in accordance with control from the controller 13. The motor 30 includes, for example, a first motor, a second motor, and a third motor. The first motor serving as the motor 30 drives the conveyance mechanism 16. The second motor serving as the motor 30 rotates the photoconductor drum 71. The third motor serving as the motor 30 rotates the drive roller 92. A plurality of second motors are provided corresponding to the photoconductor drums 71 provided in the plurality of image forming stations 41. The motor 30 may include motors other than the first, second, and third motors.

Next, an image forming system 200 including the image forming apparatus 1 and a server 201 according to an embodiment will be described.

The image forming apparatus 1 having the above-described configuration may be operated in the image forming system 200 connected to the server 201. For example, the server 201 operates as a management device that manages data recorded in the RFID tags attached to all the print media P in order to manage the print media P. The server 201 may indicate the data that the image forming apparatus 1 writes to the RFID tag of the print medium P.

The server 201 stores the data written into the RFID tag of the print medium P by the image forming apparatus 1 together with the data such as the date and time of the writing, thereby managing the history in which the print medium P is processed. In addition, the server 201 acquires the data read by the image forming apparatus 1 from RFID tag of the print medium P. The server 201 stores the data read by the image forming apparatus 1 from the RFID tag of the print medium P together with the information such as the date and time of the reading, thereby managing the history in which the print medium P is processed.

Figure 3:
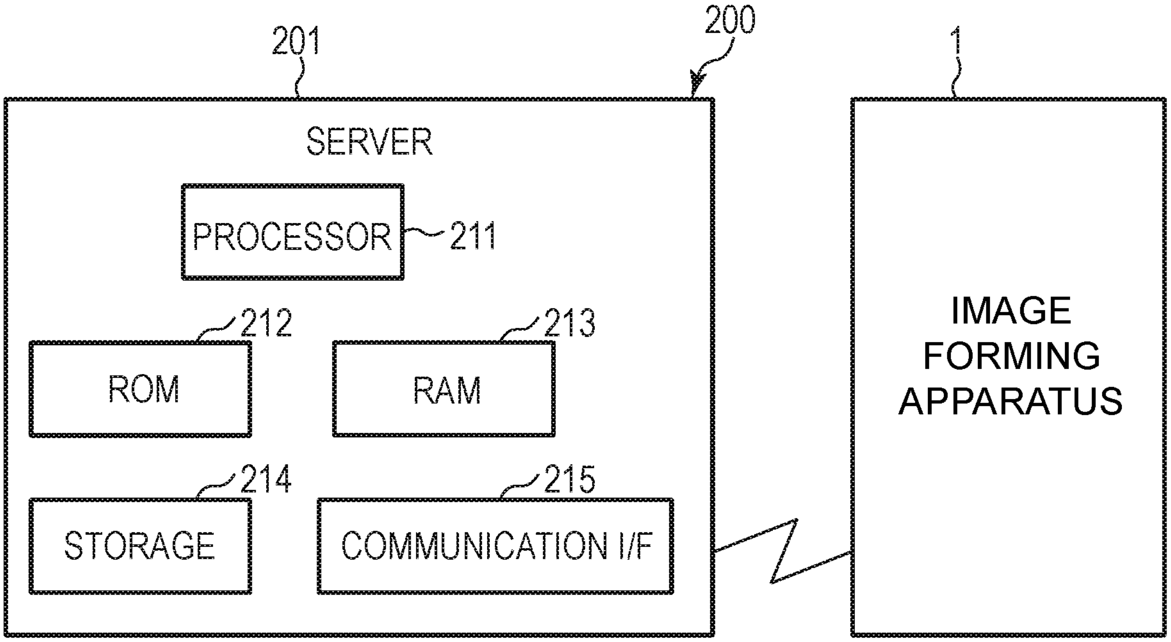
FIG. 3 is a block diagram of an image forming system including the image forming apparatus.

FIG. 3 is a hardware block diagram of the image forming system 200 including the image forming apparatus 1 and the server 201 according to an embodiment.

In the configuration example illustrated in FIG. 3, the image forming apparatus 1 is an MFP having a configuration as illustrated in FIGS. 1 and 2. In the exemplary configuration illustrated in FIG. 3, the servers 201 include a processor 211, a ROM 212, a RAM 213, a storage device 214, and a communication interface 215. The processor 211 is, for example, a CPU. The processor 211 executes various processes by executing a program. For example, the processor 211 executes an operating system or an application program.

The ROM 212 is a non-volatile memory area. The RAM 212 is a volatile memory area. The ROM 212 stores, for example, an operating system or an application program. The ROM 212 stores control data required for the processor 211 to execute a process for controlling each unit. The RAM 213 is used as a work area in which the processor 211 appropriately rewrites data. The RAM 213 has, for example, a work area for storing images.

The storage device 214 is an EEPROM, a HDD, or an SSD, for example. The storage device 214 stores data such as setting data used by the processor 211 to perform various processes. The storage device 214 stores data generated by processing executed by the processor 211. The storage device 214 may store an application program.

The storage device 214 may store information stored in the RFID tag included in the print medium P processed by the image forming apparatus 1. For example, the storage device 214 may store data written in the RFID tag of the print medium P by the image forming apparatus 1 together with date and time information. In addition, the server 201 may store the data read by the image forming apparatus 1 from the RFID tag of the print medium P together with the date and time information.

The communication interface 215 is a communication interface circuit for communicating with other devices connected through a network. The communication interface 215 is used for communication with the image forming apparatus 1. The communication interface 215 is, for example, an interface for LAN communication. The communication interface 215 may be an interface that wirelessly communicates with other devices according to a standard such as Bluetooth or Wi-Fi.

Next, image forming processing and tag processing on the print medium P including the RFID tag by the image forming apparatus 1 according to an embodiment will be described.

The image forming apparatus 1 executes image forming processing of printing an image on a print medium P and tag processing on the RFID tag of the print medium P as a process for one print job. In the image forming processing, the system controller 13 of the image forming apparatus 1 controls the value of the secondary transfer bias in accordance with the result of the tag processing.

Figure 4:
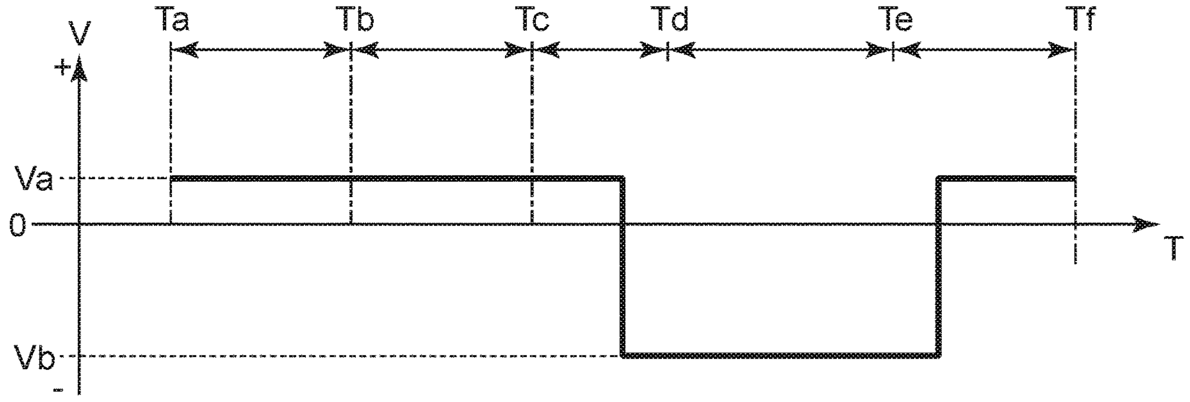
FIG. 4 is a transition diagram of a secondary transfer bias in the image forming apparatus.
Figure 5:
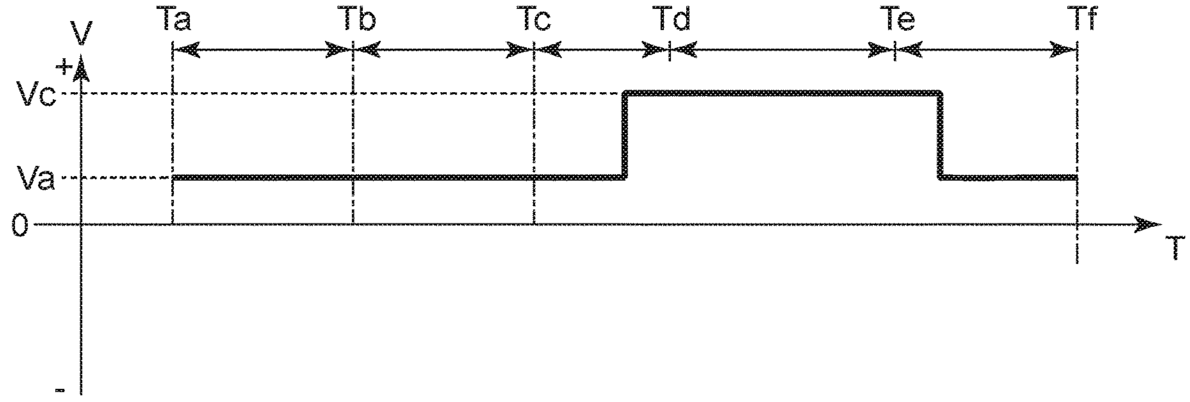
FIG. 5 is a first transition diagram of a secondary transfer bias in the image forming apparatus.
Figure 6:
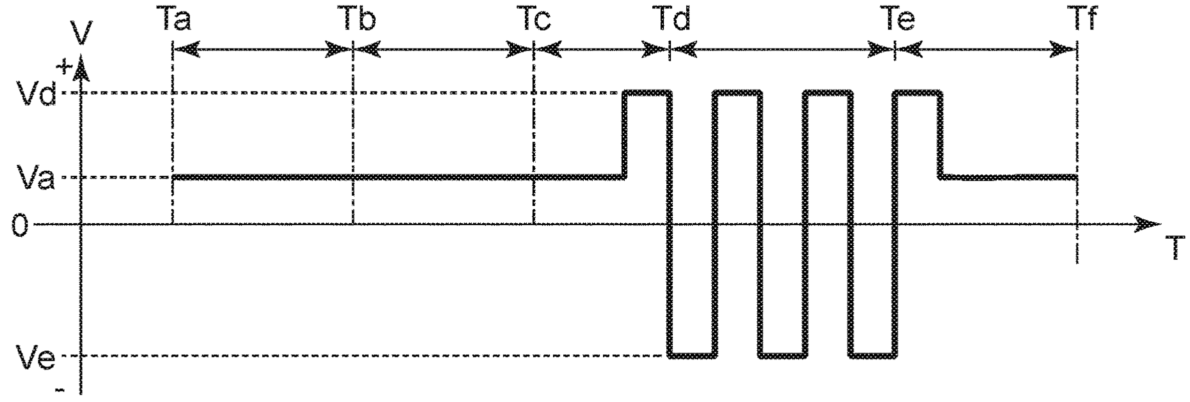
FIG. 6 is a transition diagram of a secondary transfer bias in the image forming apparatus.

FIGS. 4 to 6 are diagrams showing the transition of the bias voltage applied by the secondary transfer roller 94 between the time when the image forming apparatus 1 feeds the print medium P and the time when the transfer control ends. In FIGS. 4 to 6, a time Ta is a timing at which the feeding of the print medium P from the sheet tray 14 is started. A time Tb is a timing at which the tag processing for the RFID tag of the print medium P is started using the tag communication device 19. A time Tc is a timing at which a predetermined time for the tag processing to be completed (i.e., a time limit for the tag processing). The period from the time Tb to the time Tc (i.e., time Tb–Tc) is a time period for executing a processing on the RFID tag of the print medium P.

In addition, the tag processing may be executed in a state in which the print medium P is stopped at a predetermined position (hereinafter referred to as a standby position) in front of the registration roller 36. When the tag processing is executed while the printing medium P is stopped at the standby position, the time Tb is the timing at which the printing medium P reaches the registration roller 36. The time Tc is the timing at which the registration roller 36 is operated, i.e., the timing at which the registration roller 36 starts to convey the print medium P to the transfer position. Here, the period Ta–Tb is a period in which the print medium P is conveyed from the sheet tray 14 to the standby position in front of the registration roller 36.

The time Td is a timing at which the print medium P reaches the secondary transfer position (also simply referred to as the transfer position). A time Te is a timing at which the print medium P completes the passage of the secondary transfer position. The time period Td-Te is a time period during which the print medium P passes through the secondary transfer position. The transfer bias applied by the secondary transfer roller 94 needs to be changed to the value of the transfer bias of the transfer setting information before the printing medium P reaches the secondary transfer position. Therefore, the timing of changing the transfer setting information to the transfer bias data is between the time Tc and the time Td. A time Tf is a timing at which the transfer control operation is terminated.

FIG. 4 is a diagram illustrating a transition example of the bias voltage applied by the secondary transfer roller 94 when the tag processing is normally completed.

When a print job is started, the bias voltage applied by the secondary transfer roller 94 is set to a predetermined positive bias voltage Va (hereinafter referred to as a suppressing voltage). The suppressing voltage Va is a bias voltage set for suppressing the adherence of the toner to the secondary transfer roller 94. For example, even when the toner adheres to the transfer belt 91 for some reason, the suppressing voltage Va suppresses the toner from adhering to the secondary transfer roller 94.

In the embodiment illustrated in FIG. 4, during the time period Ta–Tc, the secondary transfer roller 94 continues to apply the suppressing voltage Va. During the period from the time Tc to the time Td, the bias voltage applied by the secondary transfer roller 94 transitions to a transfer bias voltage Vb (hereinafter also referred to as a print bias voltage) used for normal printing. FIG. 4 shows the transfer bias voltage Vb for transferring the toner image on the transfer belt 91 to the print medium P at a normal density when the tag processing is normally completed. For example, in the transfer bias voltage Vb shown in FIG. 4, a negative maximum voltage may be applied to transfer the toner image to the print medium P at a normal density.

When the tag processing is normally completed, the processor 131 performs transfer setting of the normal density for transferring the toner image on the transfer belt 91 to the printing medium P at the normal density. When the tag processing is normally completed, the processor 131 reads the transfer setting information of the transfer setting of the normal density from the auxiliary storage device 134. The transfer setting information of the normal density includes information indicating the transfer bias voltage Vb for transferring the toner image on the transfer belt 91 to the print medium P at the normal density. The processor 131 controls the secondary transfer roller 94 to apply the transfer bias voltage Vb included in the transfer setting information of the normal density. Further, the processor 131 instructs to switch the transfer bias voltage Vb to the suppressing voltage Va between the time Te and the time Tf.

As shown in FIG. 4, the secondary transfer bias set to the suppressing voltage Va in the time period Ta–Tc transitions to the transfer bias voltage Vb prior to the time Td when the tag processing is normally completed. Further, the secondary transfer bias set in the transfer bias voltage Vb transitions to the suppressing voltage Va after the lapse of the time Te. As a result, while the print medium P passes through the transfer position, the secondary transfer bias having the transfer bias voltage Vb is applied so that the toner image on the transfer belt 91 is transferred to the print medium P at the normal density.

FIG. 5 is a diagram illustrating a first transition example of the bias voltage applied by the secondary transfer roller 94 in a case where the tag processing is not normally completed.

In the example illustrated in FIG. 5, during the time period Ta–Tc, the secondary transfer roller 94 maintains the suppressing voltage Va in the same manner as in FIG. 4. The processor 131 determines whether the tag processing to be performed during the time period Tb–Tc has been successfully completed. In the example illustrated in FIG. 5, it is assumed that the processor 131 determines that the tag processing has not been completed normally. In a case where the tag processing is not normally completed, the processor 131 performs transfer setting of the abnormal density for transferring the toner image on the transfer belt 91 to the print medium P at the abnormal density different from the normal density.

In a case where the tag processing is not normally completed, the processor 131 reads the transfer setting information indicating the transfer setting of the abnormal density from the auxiliary storage device 134. The transfer setting information of the abnormal density includes information indicating a transfer bias voltage Vc for transferring the toner image on the transfer belt 91 to the print medium P at the abnormal density. The processor 131 controls the secondary transfer roller 94 to apply the transfer bias voltage Vc indicated in the transfer setting information of the abnormal density. As a result, the secondary transfer bias that is set to the suppressing voltage Va in the time period Ta−Tc transitions to the transfer bias voltage Vc prior to the time Td, as illustrated in FIG. 5.

Further, the processor 131 instructs to switch the transfer bias voltage Vc to the suppressing voltage Va after the print medium P passes through the transfer position from the time Te to the time Tf. As a result, the secondary transfer bias set in the transfer bias voltage Vb transitions to the suppressing voltage Va after the lapse of the time Te.

In the embodiment illustrated in FIG. 5, the transfer bias voltage Vc is positive, which is opposite to the print bias voltage Vb for transferring a toner image at the normal density. For example, the transfer bias voltage Vc may be the positive maximum voltage.

When a positive transfer bias voltage is applied by the secondary transfer roller 94, the toner on the transfer belt 91 is less likely to be transferred. However, since the transfer belt 91 and the printing medium P come into contact with each other at the transfer position, the toner image on the transfer belt 91 is transferred to the printing medium P lightly even if the secondary transfer bias voltage is set to the positive maximum voltage. That is, when the transfer bias is set to the positive print bias voltage Vb, the density of the images transferred to the print medium P is reduced.

The transfer bias voltage Vc may be set so that the density of the toner image transferred to the print medium P clearly differs from the normal density. For example, the transfer bias voltage Vc may be the suppressing voltage Va or a negative voltage greater than the transfer bias voltage Vb.

As shown in FIG. 5, by changing the secondary transfer bias voltage, an image having a density lower than the normal density for normal printing is transferred to a printing medium P. The print medium P on which the light image has been transferred can clearly indicate that the processing for the RFID tag has failed. The user can reliably recognize print media P in which tag processing for the RFID tags have failed by visually viewing the thin images lightly transferred to the print media P.

FIG. 6 is a diagram illustrating a second transition example of the bias voltage applied by the secondary transfer roller 94 in a case where the tag processing is not normally completed.

In the example illustrated in FIG. 6, the secondary transfer bias is controlled so that the negative voltage Ve and the opposite, positive voltage Vd are alternately applied while the print medium P passes through the transfer position. As the secondary transfer bias fluctuates, the toner image on the transfer belt 91 is transferred to the printing medium P in a state in which the density of the toner image is reduced.

The negative voltage Ve shown in FIG. 6 may be the same as the transfer bias voltage Vb shown in FIG. 4. The positive voltage Vd shown in FIG. 6 may be the same as the transfer bias voltage Vc shown in FIG. 5. Further, the switching between the positive voltage Vd and the negative voltage Ve may be switched at a controllable frequency. For example, the positive voltage Vd and the negative voltage Ve are switched such that the switching can be done within a certain time period. Further, the voltage Vd and the voltage Ve may be switched every time the secondary transfer roller 94 rotates. The switching between the positive voltage Vd and the negative voltage Ve may not be performed at predetermined intervals.

As shown in FIG. 6, when the secondary transfer bias is varied, a grayscale image is transferred to the print medium P. The print medium P to which the grayscale image has been transferred can clearly indicate that the processing for the RFID tag has failed. The user can easily recognize the grayscale image transferred to the print medium P as the print medium P in which the tag processing for the RFID tags has failed.

Figure 7:
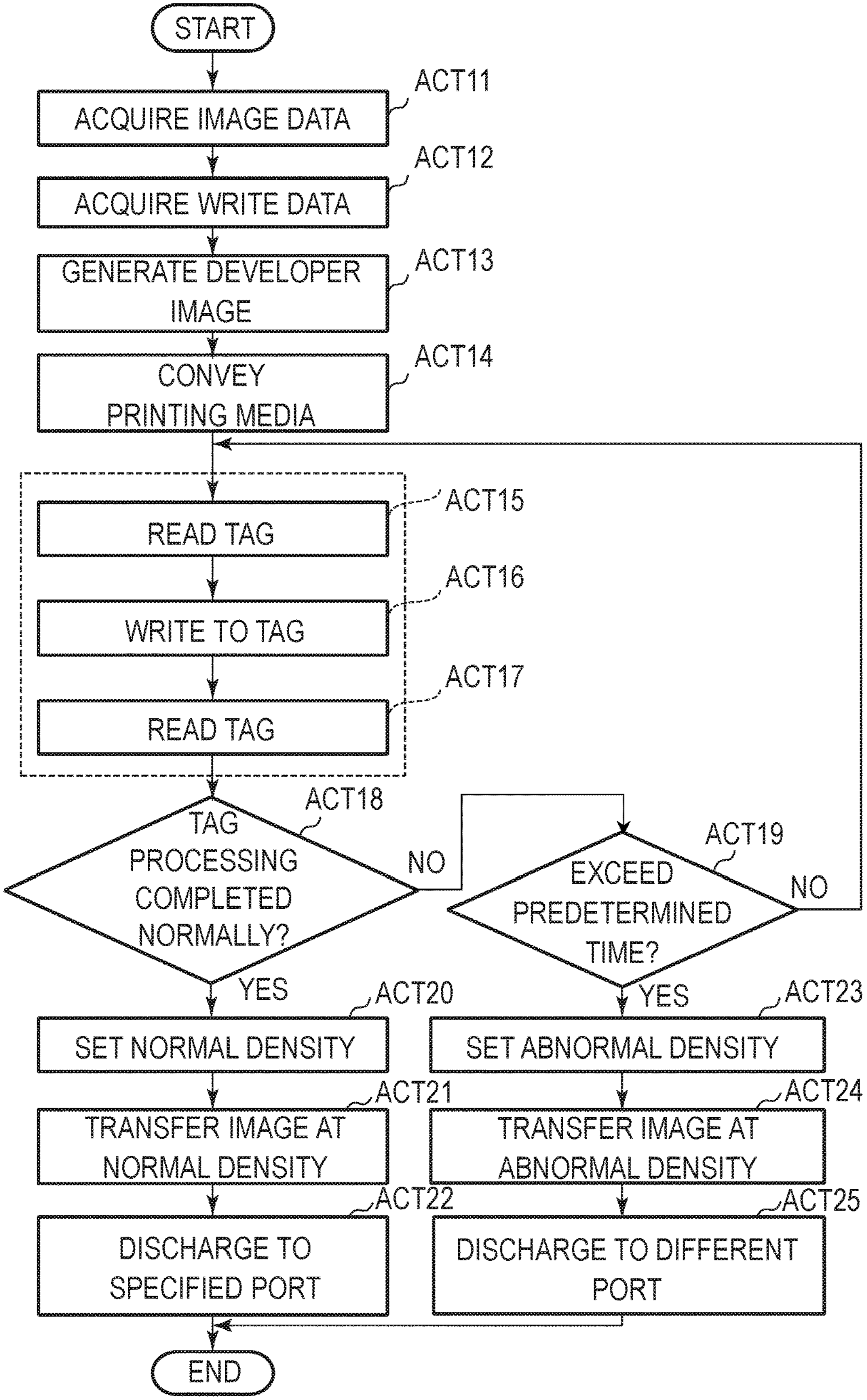
FIG. 7 is a flowchart of an operation of printing process including tag processing in the image forming apparatus.

Next, image forming processing for printing on a print medium P including an RFID tag by the image forming apparatus 1 will be described with reference to FIG. 7.

The image forming apparatus 1 receives a print job from an external device connected to the communication interface 12 or a print job input to the control panel 21. Here, it is assumed that the image forming apparatus 1 receives a print job including tag processing and image forming processing on a print medium P including an RFID tag from an external device. In the exemplary process illustrated in FIG. 7, it is assumed that the tag processing included in the print job is a write process of writing data to the RFID tag of the print medium P.

When executing the received print job, the processor 131 acquires image data to be printed on the print medium P including the RFID tag (ACT11). For example, the processor 131 acquires the image data together with the print job from the external device through the communication interface 12.

Further, the processor 131 acquires write data to be written to the RFID tag of the print medium P through the tag processing included in the print job (ACT12). For example, the processor 131 acquires the write data together with the print job from the external device by the communication interface 12. Further, the processor 131 may acquire, from the servers 201, the write data to be written to the RFID tag of the print medium P for printing the image data from the external device.

After acquiring the image data to be printed on the print medium P, the processor 131 starts the image generation processing of forming a developer image on the transfer belt 91 by the image forming mechanism 17 (ACT13). For example, when the image data is a color image, the processor 131 controls the image forming stations 41 to generate and transfer the developer images of the corresponding colors onto the transfer belt 91 in a superimposed manner. When the image data is a black image, the processor 131 controls the black image forming station 41 to generate and transfer the black developer image onto the transfer belt 91.

The processor 131 also controls the conveyance mechanism 16 to retrieve the print medium P with the RFID tag used for processing the print job to be executed (ACT14). For example, the processor 131 may control the conveyance mechanism 16 to retrieve the print medium P comprising the RFID tag from the sheet tray 14. The processor 131 controls the conveyance mechanism 16 to convey the print medium P retrieved from the sheet tray 14 to the front of the registration roller 36.

When the print medium P is conveyed in front of the registration roller 36, the processor 131 executes tag processing of processing the RFID tag of the print medium P using the tag communication device 19 (ACTS 15-17). In the exemplary process illustrated in FIG. 4, write processing of writing write data to the RFID tag is executed as the tag processing.

In the write processing, the processor 131 first controls the tag communication device 19 to read the data recorded in the RFID tag of the print medium P (ACT15). For example, the processor 131 controls the tag communication device 19 to communicate with the RFID tag of the print medium P. In response to an instruction from the processor 131, the tag communication device 19 outputs a radio wave or signal including a command requesting a response from the RFID tag. The RFID tag within the communication area of the tag communication device 19 is activated by the radio wave from the tag communication device 19. The activated RFID tag outputs information as a response to the command included in the radio wave from the tag communication device 19 (for example, identifying information). The tag communication device 19 receives the response from the RFID tag and provides the received data to the processor 131.

When the RFID tag is read by the tag communication device 19, the processor 131 controls the tag communication device 19 to issue a request for writing the write data to the RFID tag. For example, the tag communication device 19 outputs a radio wave including a write command for requesting writing of write data supplied from the processor 131 to the RFID tag. The RFID tag executes the processing of writing the write data into the internal memory in accordance with the write command from the tag communication device 19. When the writing of the writing data is completed, the RFID tag outputs a response indicating that the writing is completed. The tag communication device 19 receives a response indicating completion of writing from the RFID tag, and notifies the processor 131 of completion of writing.

When the processor 131 acquires the notification of completion of writing from the tag communication device 19, the processor 131 controls the tag communication device 19 to request the RFID tag to read the data written in the internal memory (ACT16). For example, the tag communication device 19 outputs, to the RFID tag, a radio wave including a verify read command requesting reading of the data recorded in the internal memory. The RFID tag reads the data recorded in the internal memory in accordance with the read command from the tag communication device 19. The RFID tag outputs the data read from the internal memory as a response to the read command. The tag communication device 19 receives a response including the data read from the inner memory of the RFID tag. The tag communication device 19 provides the data received from the RFID tag to the processor 131.

When the series of tag processing for the RFID tag of the print medium P is completed, the processor 131 determines whether the tag processing has been normally executed (ACT17). For example, the processor 131 determines whether the tag processing (i.e., the write processing) is normally completed based on whether the write data instructed to be written matches the data read after the write processing. The processor 131 determines that the write process has been normally completed when the write data matches the read data. In addition, the processor 131 determines that the write process is not normally completed when the write data does not match the read data.

When it is determined that the tag processing has not been normally completed (ACT17, NO), the processor 131 determines whether the elapsed time is within a predetermined time (i.e., a time limit for the tag processing) (ACT18). The processor 131 executes ACTS 15-17 process again if it is determined that the process has not ended normally and if the elapsed time is within the predetermined time (ACT18, YES).

When the tag processing is normally completed (ACT17, YES), the processor 131 performs setting related to transfer control based on transfer setting information indicating a first control value for transferring the toner image to the print medium P at a normal density (ACT20). The first control value indicates a value of a transfer or print bias voltage for transferring the toner image formed on the transfer belt 91 to the print medium P at the normal density.

The transfer bias voltage for the normal density is, for example, the negative maximum voltage Vb as shown in FIG. 4. The processor 131 sets the transfer bias voltage Vb indicated by the transfer setting information of the normal density to the secondary transfer roller 94. The secondary transfer roller 94 applies the voltage Vb specified by the processor 131 as a transfer bias.

When the transfer bias is set based on the transfer setting information of the normal density, the processor 131 controls the conveyance mechanism 16 to convey the print medium P to the transfer position. The processor 131 controls the transfer belt 91 to transfer the toner image on the transfer belt 91 to the print medium P at the normal density by passing the transfer position to which the transfer bias for transferring at the normal density is applied (ACT21).

The processor 131 controls the conveyance mechanism 16 to convey the print medium P on which the toner image has been transferred at the normal density to the fixing unit 18 when the toner image has passed through the transfer position. The fixing unit 18 fixes the toner image transferred at the normal density to the printing medium P by heating and pressurizing the heat roller 34 and the pressure roller 35.

The processor 131 controls the conveyance mechanism 16 to further convey the print medium P on which the toner image transferred at the normal density by the fixing unit 18 has been fixed to the discharge tray 15. The processor 131 controls the conveyance mechanism 16 to discharge the print medium P onto which the normal density of the toner image has been transferred and fixed to the specified position specified by the print job (ACT22).

When the tag processing is not normally completed (ACT17, NO), the processor 131 performs transfer setting for transferring the toner image to the print medium P at an abnormal density that is not the normal density (ACT20). Here, the processor 131 sets, as the transfer bias, a second control value indicated by the transfer setting information of the abnormal density.

The second control value indicates a setting value of a transfer bias voltage for transferring the toner image formed on the transfer belt 91 to the print medium P at the abnormal density.

The setting of the transfer bias to be transferred at the abnormal density is, for example, the negative maximum voltage Vc as shown in FIG. 5. The processor 131 sets the transfer bias voltage Vc indicated by the transfer setting information of the abnormal density to the secondary transfer roller 94. As a result, the secondary transfer roller 94 applies the voltage Vc designated by the processor 131 as a transfer bias.

In addition, as the setting of the transfer bias to be transferred at the abnormal density, the positive maximum voltage Vd and the negative voltage Ve as shown in FIG. 6 may be alternately applied. Here, the processor 131 sets the transfer bias to the secondary transfer roller 94 so as to alternately apply the voltage Vc and the voltage Ve. Accordingly, the secondary transfer roller 94 alternately applies the voltage Vc and the voltage Ve designated by the processor 131 as transfer biases.

When the transfer bias is set based on the transfer setting information of the abnormal density, the processor 131 controls the conveyance mechanism 16 to convey the print medium P to the transfer position. The processor 131 controls the transfer belt 91 to transfer the toner image to the print medium P at the abnormal density by passing the transfer position to which the transfer bias for transferring at the abnormal density is applied (ACT24).

The processor 131 controls the conveyance mechanism 16 to convey the print medium P having the toner image transferred at the abnormal density to the fixing unit 18 when passing through the transfer position. The fixing unit 18 heats and presses the printing medium P by the heat roller 34 and the pressure roller 35 to fix the toner image transferred at the abnormal density to the printing medium P.

The processor 131 controls the conveyance mechanism 16 to convey the print medium P on which the toner image having the abnormal density is fixed by the fixing unit 18 to the discharge tray 15. Alternatively, the processor 131 may control the conveyance mechanism 16 to discharge the print medium P on which the toner image having the abnormal density is transferred and fixed to a discharge tray (not shown) different from the discharge tray 15 and not designated by the print job (ACT25).

Note that the tag processing of ACTS 15-17 may be processing other than writing process. The processor 131 may determine whether the tag processing has been normally completed based on whether normal data has been exchanged between the tag communication device 19 and the RFID tag. If the tag processing is read processing, the processor 131 determines that the tag processing has not been normally completed if there is no response from the RFID tag or if the response from the RFID tag is not in a normal data format.

As described above, the image forming apparatus 1 according to an embodiment prints on a medium including a wireless tag as a print medium P. The image forming apparatus 1 controls the operation of the transfer unit with transfer setting information for transferring the toner image to the print medium P at a normal density when communication with the wireless tag of the print medium P by the communication device 19 is normally executed. The image forming apparatus 1 controls the operation of the transfer unit with transfer setting information for transferring the toner image to the print medium P at an abnormal density in a case where the communication with the wireless tag of the print medium by the communication device 19 is not normally completed.

This makes it easy to print an image at a different density on a print medium P when the wireless tag does not operate normally. As a result, the print medium P with the wireless tag on which the tag processing has not been performed properly can be clearly visually recognized.

It should be noted that the above-described examples have been described using an MFP including an electrophotographic printer as an example of the image forming apparatus 1. However, the image forming apparatus 1 may be any device capable of changing the density of an image to be formed on a print medium in accordance with the processing result on the RFID tag included in the print medium. That is, the above-described examples are not limited to the ones applied to the electrophotographic image forming apparatus 1, and may be applied to any image forming apparatus of an image forming system other than an electrophotographic system.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus comprising:

a wireless tag communication device configured to transmit a radio wave to communicate with a wireless tag, and receive a response wave therefrom;

an image forming mechanism including a transfer roller and configured to form an image on a medium and transfer the image from the medium to a sheet through the transfer roller, according to a control value; and a controller configured to:

receive a print job for printing an image on a sheet and performing tag processing on a wireless tag embedded in or attached to the sheet, control the wireless tag communication device to perform the tag processing on the wireless tag, determine whether the tag processing has completed properly, upon determining that the tag processing has completed properly, control the image forming mechanism to form the image on the medium and transfer the image from the medium to the sheet according to a first control value, and upon determining that the tag processing has not completed properly, control the image forming mechanism to form the image on the medium and transfer the image from the medium to the sheet according to at least one second control value different from the first control value, wherein the first control value indicates a first bias voltage applied to the transfer roller, and the second control value indicates a second bias voltage applied to the transfer roller and different from the first bias voltage.

2. The image forming apparatus according to claim 1, wherein the image forming mechanism transfers the image at a first density using the first control value, and the image forming mechanism transfers the image at a second density different from the first density using the second control value.

3. The image forming apparatus according to claim 2, wherein the second density is lighter than the first density.

4. The image forming apparatus according to claim 1, wherein when the tag processing has not completed properly, the controller controls the image forming mechanism to form the image on the medium and transfer the image from the medium to the sheet further using a third control value different from the second control value.

5. The image forming apparatus according to claim 4, wherein when the tag processing has not completed properly, the image forming mechanism transfers the image alternately using the second and third control values.

6. The image forming apparatus according to claim 1, wherein the first bias voltage is a negative voltage, and the second bias voltage is a positive voltage.

7. The image forming apparatus according to claim 1, wherein the controller determines that the tag processing has not completed properly when the tag processing has not completed within a predetermined time.

8. The image forming apparatus according to claim 1, further comprising:

a conveyance mechanism configured to convey the sheet, wherein the controller is configured to control the conveyance mechanism to convey the sheet to a different port depending on whether the tag processing has completed properly.

9. A method carried out by an image forming apparatus that includes:

a wireless tag communication device configured to transmit a radio wave to communicate with a wireless tag, and receive a response wave therefrom, and an image forming mechanism including a transfer roller and configured to form an image on a medium and transfer the image from the medium to the sheet through the transfer roller, according to a control value, the method comprising:

receiving a print job for printing an image on a sheet and performing tag processing on a wireless tag embedded in or attached to the sheet;

controlling the wireless tag communication device to perform the tag processing on the wireless tag;

determining whether the tag processing has completed properly;

upon determining that the tag processing has completed properly, controlling the image forming mechanism to form the image on the medium and transfer the image from the medium to the sheet according to a first control value; and upon determining that the tag processing has not completed properly, controlling the image forming mechanism to form the image on the medium and transfer the image from the medium to the sheet according to at least one second control value different from the first control value, wherein the first control value indicates a first bias voltage applied to the transfer roller, and the second control value indicates a second bias voltage applied to the transfer roller and different from the first bias voltage.

10. The method according to claim 9, wherein the image forming mechanism transfers the image at a first density using the first control value, and the image forming mechanism transfers the image at a second density different from the first density using the second control value.

11. The method according to claim 10, wherein the second density is lighter than the first density.

12. The method according to claim 9, wherein controlling the image forming mechanism upon determining that the tag processing has not completed properly includes further using a third control value different from the second control value to transfer the image.

13. The method according to claim 12, wherein the second and third control values are alternately used.

14. The method according to claim 9, wherein the first bias voltage is a negative voltage, and the second bias voltage is a positive voltage.

15. The method according to claim 9, wherein determining includes determining whether the tag processing has not completed within a predetermined period.

16. An image forming system comprising:

a server configured to manage data read from or written into a wireless tag embedded in or attached to a sheet; and an image forming apparatus including:

a wireless tag communication device configured to transmit a radio wave to communicate with the wireless tag of the sheet, and receive a response wave therefrom, an image forming mechanism including a transfer roller and configured to form an image on a medium and transfer the image from the medium to the sheet through the transfer roller, according to a control value, and a controller configured to:

receive a print job for printing an image on a sheet and reading or writing data from or into a wireless tag of the sheet, control the wireless tag communication device to perform the reading or writing on the wireless tag, determine whether the reading or writing has completed properly, upon determining that the reading or writing has completed properly, control the image forming mechanism to form the image on the medium and transfer the image from the medium to the sheet according to a first control value, and transmit the read or written data to the server, and upon determining that the reading or writing has not completed properly, control the image forming mechanism to form the image on the medium and transfer the image from the medium to the sheet according to at least one second control value different from the first control value, wherein the first control value indicates a first bias voltage applied to the transfer roller, and the second control value indicates a second bias voltage applied to the transfer roller and different from the first bias voltage.

* * * * *